J. FOX.
Cracker-Machines.
No. 143,686. Patented Oct. 14, 1873.
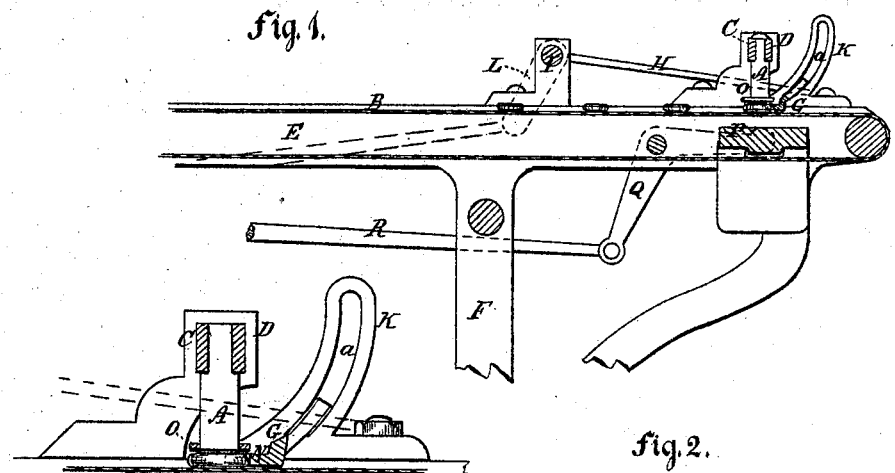
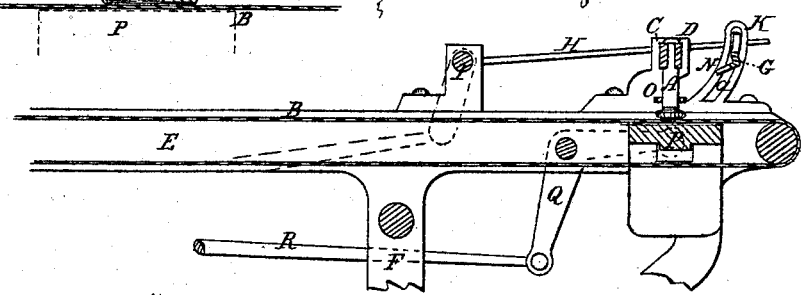
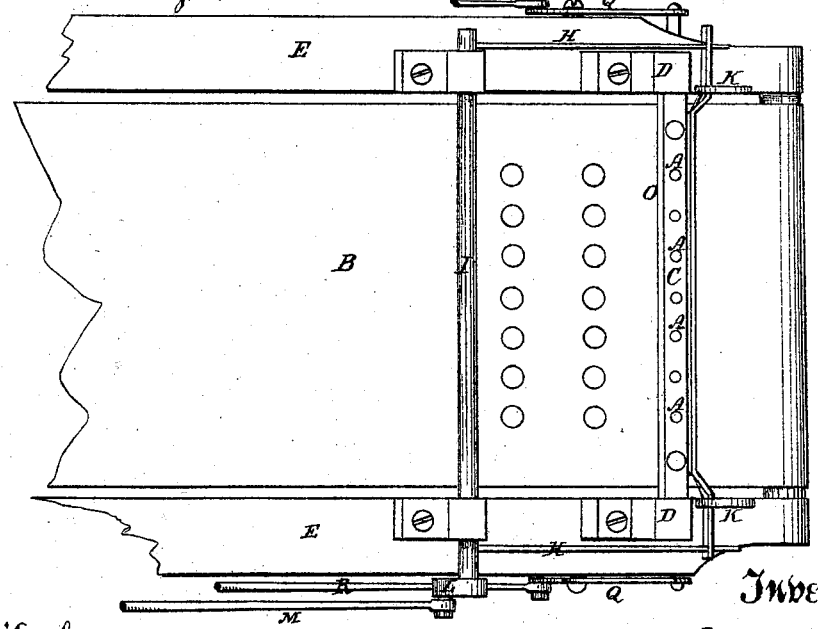
Witnesses:
J. West Wagner,
Wm. J. Dayton.
Inventor:
Joseph Fox,
By Johnson, Klauski & Co.
his Atty.

UNITED STATES PATENT OFFICE.

JOSEPH FOX, OF LANSINGBURG, NEW YORK.

IMPROVEMENT IN CRACKER-MACHINES.

Specification forming part of Letters Patent No. 143,686, dated October 14, 1873; application filed April 10, 1873.

*To all whom it may concern:*

Be it known that I, JOSEPH FOX, of Lansingburg, in the county of Rensselaer and State of New York, have invented certain new and useful Improvements in Machines for Making Crackers, of which the following is a specification:

The object of my invention is to accomplish certain advantageous results in the manufacture of the sponge or butter cracker, and is designed as an improvement upon the invention patented to me February 1, 1859, and extended April 2, 1873; the said improvements consisting in the combination, with an intermittently-feeding apron for the crackers, of a movable guide, which will serve both to line transversely and range longitudinally the intermittently-fed crackers upon said apron for the action of the pressing-dies; also, in the combination of a longitudinally cracker rowing or ranging movable guide with a series of cracker-dies and an endless feeding-apron, whereby the crackers are fed by the apron and arranged with precision directly beneath the dies to receive their pressure; also, of a plate for rowing the crackers crosswise and ranging them lengthwise as they are fed upon the apron, having a compound movement to carry it both downward and inward simultaneously toward the pressing-dies and apron, and to recede therefrom outward and upward, for the purpose of bringing the active edges of the guide directly beneath the doffing-plate, and nearly in line with the vertical cylindrical surface of the dies to center each cracker for pressure, and to move out and up from the doffing-plate to let the crackers pass off; also, in the combination, in a cracker-machine, of the guide, constructed and operating substantially as described, with the dies, a doffing-plate, an intermittently-moving feeding-apron, and an intermittently-acting presser.

In the accompanying drawings, Figure 1 represents a vertical longitudinal section of so much of a cracker-machine as illustrates the application of my invention, and showing the crackers in the position they occupy with the guide before being pressed by the finishing-dies. Fig. 2 represents a similar view, showing the guide elevated to allow the crackers to pass out from beneath the dies. Fig. 3 represents a top view of the same; and Fig. 4 represents the notched guide for rowing and ranging the crackers to the dies, detached.

The machine as patented to me heretofore is designed to make what is known as "Fox's Excelsior Crackers" from skin-covered dough; and as that machine is fully described and shown in my said patent, a full description thereof is deemed unnecessary here, further than to state that the sheet of dough is fed from a bed of rollers and passes through grooved rollers, which form it into skin-covered cylindrical strips, with their edges perfectly joined, thence through ways to the action of a suddenly-moving clipping-knife, which separates them into pieces of suitable lengths, which are pressed endwise into crackers against the separating-knife, and deposited upon an endless intermittently-moving apron, upon which they are conveyed to the lining and ranging guide of the finishing-dies.

In practice I have found that the crackers, after being formed and pressed, will contract and lose their proper proportions and diameter while in transit upon the apron to the delivery end. To restore to the crackers their proper proportions and diameter, and to impart to them a finishing pressure before being delivered on the pans ready for the oven, is one of the objects of my present invention.

In the machine described in my patent the delivering end of the frame is provided with a pricking-stamp, to indent upon the crackers the inventor's name and the usual prick-points, the pressure upon the crackers being only sufficient for this purpose, and not to impart to the crackers a finished face, which has, however, been found by experience to be highly advantageous and necessary to the production of a perfect cracker. The finishing-dies A are arranged above the apron B, at the delivering end thereof, and are mounted in a horizontal bar, C, supported in suitable standard-brackets D upon the top beams E of the frame F, so that the pressing ends of the dies shall be a distance above the surface of the apron B slightly greater than the thickness of the crackers. These dies are of a diameter a little less than that of the crackers, and are fixed; and the endless apron has imparted to it, by suitable devices, an intermittently-traversing movement upon rollers, to present the crackers to the dies and hold them there while being pressed. Immediately in front of the dies, and parallel therewith, I arrange a guide, G, mounted upon arms H, by which it is operated by imparting to said arms, from their axis-rod I, a vibratory movement, through suitable connecting mechanism with the main driving or crank shaft of the machine, the movement of the guide G being in harmony with the movement of the crackers to the dies. The connection of this guide G with its carrying-arms H is such as to allow the guide to be moved in the arc of a circle by two slotted arms, K, within the slots $a$ of which it moves up and down, the limit of its descent being its contact with the apron. One end of the axis J of the carrying-arms H has a crank, L, the rod M from which connects with a sway-bar pivoted to the side of the main frame; and this pivoted sway-bar derives its motion from the crank-shaft, as shown in my patent aforesaid. The guide G, at its lower edge, is provided with a plate or flange, N, in which is formed a series of notches, $b$, either of a V or semicircular shape, the object of which is not only to range the crackers crosswise of the apron B, but also in the direction of the movement thereof, in order to collect and arrest the movement of the crackers and present them, at all times, directly beneath the dies A, and thereby avoid the difficulty experienced in my original invention, caused by the slipping of the apron upon its rollers, which would occasion the irregular presentation of the crackers to the puncturing-dies, which has hitherto proved a serious difficulty in the working of the machine. The operation of these guide-notches $b$ is to catch the crackers and place them within the notches by the movement of the apron; and, as the notches are arranged in a line lengthwise the apron, with the dies A, they will, with unerring accuracy, bring the crackers in proper positions, as the said guide-notches, when down, are upon the surface of the apron for that purpose. To do this effectually, however, the arc movement of the guides G is made so that its notched plate N will, when descending, pass directly beneath the doffing-plate O, through openings in which the dies A pass, so that the guide-notches $b$ of the plate N shall extend on either side of the dies, a little way off, and hold the crackers just in a vertical line therewith while they are under the operation of the presser. This presser P is arranged beneath the apron, and directly below the dies, and is mounted upon two bell-crank arms, Q, pivoted to the sides of the main frame, and operated by rods R connected with the first forming-press, so that the intermittent movements of the presser P shall accord with the feed of the crackers upon the apron. The doffing-plate O moves over the dies A, and is held down upon stop-pins $c$ by springs, which stop-pins $c$ rise from each end of the presser. When the crackers are beneath the dies, the presser P rises against the apron, and presses them in a manner and with sufficient force to give them a finished face, and expands them to the proportions which they lost in their transit to the dies. This function the pricking-stamp of my original invention could not effect, and for the want of which the crackers were left in an imperfect condition. Upon the descent of the presser, the doffer O performs its office of shedding the crackers from the ends of the dies, and they pass on and are delivered, the guide-plate G moving out of the way just previous to the ascent of the presser.

It will be observed that, by the employment of the notched guide-plate in connection with the dies, the crackers will always be presented to the dies without regard to their position upon the apron, and that the speed of the movements of the guide, the presser, and the apron must be such as to bring these several parts into operation, according to the distance between the series of rows of crackers upon the apron, so that there shall be no lost motion of these parts. The first and second pressers are operated simultaneously from the crank-shaft by means of cams.

Having described my invention, I claim—

1. In a machine for making crackers, the combination, with an intermittently cracker-feeding apron, B, of a movable guide, G, which will both line transversely and range longitudinally the crackers fed upon said apron, essentially as and for the purpose described.

2. The combination, in such a machine, of a movable longitudinally-ranging guide, G, for the crackers with a series of pressing-dies, A, and an intermittently-feeding apron, B, essentially as described.

3. A rowing and ranging plate for the crackers, operated to carry it both downward and inward simultaneously toward the pressing-dies and apron, and to recede therefrom upward and outward, for the purpose described.

4. In a cracker-machine, the combination therein of a movable ranging and rowing guide, G, constructed and operating substantially as described, with the pressing and finishing dies A, a doffing-plate, O, an intermittently-moving feeding apron, B, and an intermittently-acting presser, P, the several parts being constructed and arranged for joint operation substantially as herein specified.

In testimony whereof I have hereunto set my hand in the presence of two subscribing witnesses this 2d day of April, A. D. 1873.

JOSEPH FOX.

Witnesses:
A. E. H. JOHNSON,
J. W. HAMILTON JOHNSON.